United States Patent
Cape et al.

(10) Patent No.: US 12,280,610 B2
(45) Date of Patent: Apr. 22, 2025

(54) MICRO-OPTIC SECURITY DEVICE WITH ABSOLUTE REGISTRATION

(71) Applicant: CRANE & CO., INC., Dalton, MA (US)

(72) Inventors: Samuel M. Cape, Woodstock, GA (US); Jonathan D. Gosnell, Cumming, GA (US); Benjamin E. Bleiman, Cumming, GA (US); Jennifer Cowan, Marietta, GA (US); Ryan Toole, Washington, DC (US)

(73) Assignee: Crane & Co., Inc., Dalton, MA (US)

( * ) Notice: Subject to any disclaimer, the term of this patent is extended or adjusted under 35 U.S.C. 154(b) by 673 days.

(21) Appl. No.: 17/616,098

(22) PCT Filed: Jun. 12, 2020

(86) PCT No.: PCT/US2020/070144
§ 371 (c)(1),
(2) Date: Dec. 2, 2021

(87) PCT Pub. No.: WO2020/252507
PCT Pub. Date: Dec. 17, 2020

(65) Prior Publication Data
US 2022/0297463 A1    Sep. 22, 2022

Related U.S. Application Data

(60) Provisional application No. 62/861,864, filed on Jun. 14, 2019.

(51) Int. Cl.
*B42D 25/36* (2014.01)
*B42D 25/324* (2014.01)
(Continued)

(52) U.S. Cl.
CPC .......... *B42D 25/36* (2014.10); *B42D 25/324* (2014.10); *B42D 25/45* (2014.10); *G02B 3/0012* (2013.01); *G02B 3/0037* (2013.01); *B42D 25/425* (2014.10)

(58) Field of Classification Search
CPC ...... B42D 25/36; B42D 25/324; B42D 25/45; G02B 3/0012; G02B 3/00; G02B 3/0037
(Continued)

(56) References Cited

U.S. PATENT DOCUMENTS

2016/0176221 A1    6/2016  Holmes
2018/0272788 A1    9/2018  Bleiman et al.
(Continued)

FOREIGN PATENT DOCUMENTS

CN    1906547 A    1/2007
CN    103608186 A  2/2014
(Continued)

OTHER PUBLICATIONS

Supplementary European Search Report dated Jun. 30, 2023, in connection with European Application No. 20822489.9, 6 pages.
(Continued)

*Primary Examiner* — Justin V Lewis (57) ABSTRACT

A micro-optic security device (100) includes a planar array of micro-optic focusing elements (105) and a first arrangement of image icons (120), wherein each image icon (121) of the first arrangement of image icons includes a region of light-cured material. Further, the first arrangement of image icons is visible (320) through the planar array of micro-optic focusing elements across a first predetermined range of viewing angles relative to the micro-optic security device, and the first arrangement of image icons is not visible (360) through the planar array of micro-optic focusing elements
(Continued)

across a second pre-determined range of viewing angles relative to the micro-optic security device.

20 Claims, 7 Drawing Sheets

(51) Int. Cl.
  *B42D 25/45* (2014.01)
  *G02B 3/00* (2006.01)
  *B42D 25/425* (2014.01)
(58) Field of Classification Search
  USPC .................................. 283/67, 72, 94, 98, 901
  See application file for complete search history.

(56) References Cited

U.S. PATENT DOCUMENTS

| | | | |
|---|---|---|---|
| 2019/0152251 A1 | 5/2019 | Schilling et al. | |
| 2022/0237979 A1* | 7/2022 | Rich | B42D 25/351 |

FOREIGN PATENT DOCUMENTS

| | | | | |
|---|---|---|---|---|
| CN | 104203528 | A | 12/2014 | |
| CN | 108430792 | A | 8/2018 | |
| CN | 109414947 | A | 3/2019 | |
| CN | 109789721 | A | 5/2019 | |
| JP | 2009-543138 | A | 12/2009 | |
| JP | 2017-522602 | A | 8/2017 | |
| WO | 2014095057 | A1 | 6/2014 | |
| WO | WO-2019077419 | A1 * | 4/2019 | ............. B42D 25/00 |

OTHER PUBLICATIONS

Third Office Action dated Apr. 1, 2024, in connection with Chinese Application No. 202080043169.9, 7 pages.
International Search Report and Written Opinion of the International Searching Authority dated Aug. 19, 2020 in connection with International Application No. PCT/US2020/070144, 8 pages.
Official Action and Search Report dated Nov. 28, 2023, in connection with Russian Application No. 2021136441/28(076691), 12 pages.
Decision to Grant dated Mar. 1, 2024, in connection with Russian Application No. 2021136441/28(076691), 20 pages.
Intention to grant dated Mar. 11, 2024, in connection with European Application No. 20822489.9, 39 pages.
Notice of Reasons for Refusal dated May 7, 2024, in connection with Japanese Application No. 2021-574159, 10 pages.
First Office Action dated Feb. 23, 2023, in connection with Chinese Application No. 202080043169.9, 26 pages.
Examination report dated Oct. 19, 2023, in connection with Indian Application No. 202127060003, 6 pages.
Second Office Action dated Sep. 14, 2023, in connection with Chinese Patent Application No. 202080043169.9, 16 pages.
Notice on the Result of Substantive Examination dated Sep. 21, 2023, in connection with Indonesian Patent Application No. P00202111002, 5 pages.
Notification to Grant Patent Right for Invention dated Jul. 1, 2024, in connection with Chinese Application No. 202080043169.9, 4 pages.
European Search Report dated Sep. 10, 2024, in connection with European Application No. 24194267.1, 7 pages.
Decision of Refusal dated Dec. 3, 2024, in connection with Japanese Application No. 2021-574159, 11 pages.
Notice on the Result of Further Substantive Examination dated Dec. 28, 2024, in connection with Indonesian Application No. P00202111002, 6 pages.
Office Action issued Jan. 7, 2025, in connection with Mexican Patent Application No. MX/a/2021/014788, 7 pages.
Examination report dated Feb. 12, 2025, in connection with Australian No. 2020290585, 3 pages.

* cited by examiner

MICRO-OPTIC SECURITY DEVICE WITH ABSOLUTE REGISTRATION

CROSS-REFERENCE TO RELATED APPLICATIONS

This application is a 371 National Stage of International Application No. PCT/US2020/070144, filed Jun. 12, 2020, which claims the benefit of Provisional Application No. 62/861,864, filed Jun. 14, 2019, the disclosures of which are herein incorporated by reference in their entirety.

TECHNICAL FIELD

This disclosure relates generally to anti-counterfeiting of secure and/or high value documents, such as banknotes, passports and tickets. More specifically, this disclosure relates to a micro-optic security device with absolute registration between focusing elements and individual micro-optic layers which are magnified by the focusing elements.

BACKGROUND

Certain documents, including, without limitation, banknotes and some government-issued documents, utilize micro-optic security devices which comprise a plurality of small scale focusing elements (for example, micro-lenses), each of which has a footprint, in which visual information is provided to create a synthetic image which is visible to a viewer of the document. While the visual information in the footprint of any given lens is generally too small to be visible to the human eye, the collective operation of each focusing element of the plurality of focusing elements produces a humanly visible display (sometimes referred to as a "synthetically magnified" image, or a "synthetic image") of a portion of the visual information provided in the footprint of each focusing element's footprint. This humanly visible display provides difficult-to-counterfeit indicia of the document's authenticity.

By controlling aggregate dimensional properties (for example, pitch and angle) of visual information placed under the footprints of multiple focusing elements, the appearance of the humanly visible display provided by the micro-optic system can be tuned. For example, by adjusting the period of repetition between items of visual information (for example, an icon) relative to the pitch, or repeat period of the focusing elements, the perceived distance of the humanly visible display (which in some embodiments, is a synthetic image) relative to the plane of the document can be adjusted, such that the display appears to "float" above the document, or is at a depth below the document. Similarly, by slightly rotating an axis of repetition of the visual information relative to an axis of repetition of the plurality of focusing elements, an orthoparallactic visual effect can be achieved, wherein tilts in viewing perspective along one axis produce positional shifts in the humanly visible display along an orthogonal axis.

While a wide range of visual effects and properties of the humanly visible displays provided by micro-optic security systems can be produced by controlling aggregate spatial relationships between visual information and focusing elements, absolute registration, or the ability to position visual information at a particular location within the footprint of a focusing element, and, by implication, being able to provide visible displays at predetermined viewing angles, remains a source of technical challenges and opportunities for improvement.

SUMMARY

This disclosure provides a micro-optic security device with absolute registration.

In a first embodiment, a micro-optic security device includes a planar array of micro-optic focusing elements and a first arrangement of image icons, wherein each image icon of the first arrangement of image icons includes a region of light-cured material. Further, the first arrangement of image icons is visible through the planar array of micro-optic focusing elements across a first predetermined range of viewing angles relative to the micro-optic security device, and the first arrangement of image icons is not visible through the planar array of micro-optic focusing elements across a second predetermined range of viewing angles relative to the micro-optic security device.

In a second embodiment, a method of manufacturing a micro-optic system includes applying a layer of light-curable material to a first surface of the micro-optic system having a fixed relationship to a planar array of focusing elements, wherein the first surface is disposed proximate to one or more focal points of focusing elements of the planar array of focusing elements. The method further includes directing a first pattern of structured light at a lensing surface of the planar array of focusing elements until a first portion of the layer of light-curable material is cured to form a first arrangement of image icons, and removing or deactivating uncured light-curable material from the first surface of the micro-optic system. Additionally, the first pattern of structured light is directed at the lensing surface of the planar array of focusing elements from a first predetermined range of viewing angles relative to the planar array of focusing elements.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 7B, discussed below, and the various embodiments used to describe the principles of this disclosure in this patent document are by way of illustration only and should not be construed in any way to limit the scope of the disclosure.

Figure 1:
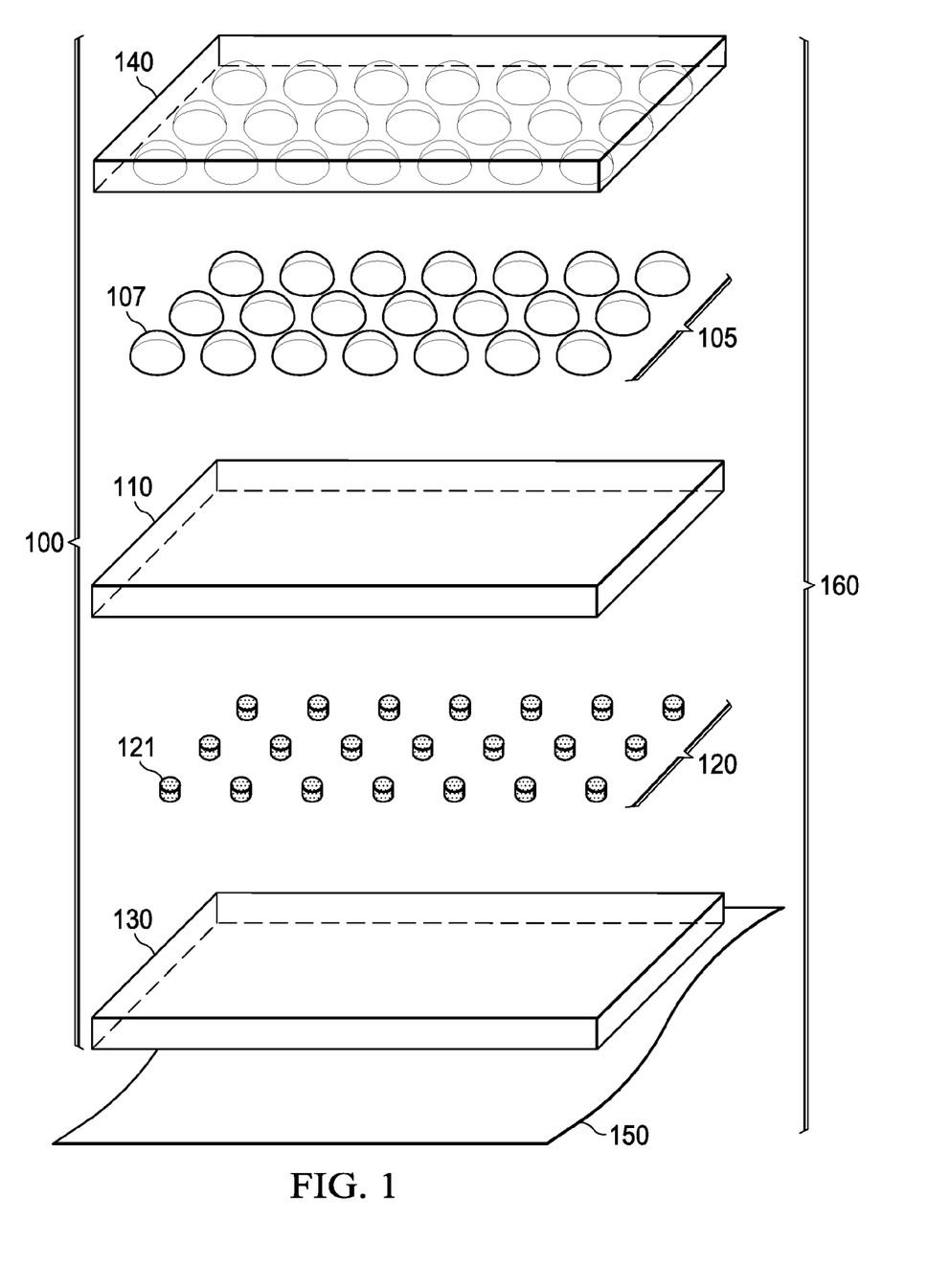
FIG. 1 illustrates an example of a micro-optic security device according to certain embodiments of this disclosure.

FIG. 1 illustrates an example of a micro-optic system 100 according to certain embodiments of this disclosure according to this disclosure.

Referring to the non-limiting example of FIG. 1, micro-optic system 100 comprises, at a fundamental level, a plurality of focusing elements 105 (including, for example, focusing element 107), and an arrangement of image icons 120 (including, for example, image icon 121). According to various embodiments, each focusing element of plurality of focusing elements 105 has a footprint, in which one or more image icons of arrangement of image icons 120 is positioned. In certain embodiments, the location of the image icons within arrangement of image icons 120 within the respective footprints of the focusing elements of plurality of focusing elements 105 is associated with a predetermined range of viewing angles relative to a coordinate system using the plane of the plurality of focusing elements 105.

By controlling the visibility of the arrangement of image icons 120 over a predetermined range of viewing angles (relative to a plane of the plurality of focusing elements 105), the performance of micro-optic system 100 is enhanced in at least the following regards: variation in viewing angles associated with a humanly visible display produced by micro-optic system 100 is reduced, thereby making it easier to detect counterfeits, and more complicated visual effects within a humanly visible display (for example, 3-D effects) may be achieved. According to certain embodiments, micro-optic system 100 can project, without limitation, synthetically magnified images, images with movement effects (for example, where the image appears to change position within a visual plane), and animation effects (for example, where the visual content projected by the system comprises views of at least one common visual element which sequentially change over a range of viewing angles, providing, for example, a "flip book" effect), or combinations thereof.

According to certain embodiments, plurality of focusing elements 105 comprises a planar array of micro-optic focusing elements. In some embodiments, the focusing elements of plurality of focusing elements 105 comprise micro-optic refractive focusing elements (for example, plano-convex or GRIN lenses). Refractive focusing elements of plurality of focusing elements 105 are, in some embodiments, produced from light cured resins with indices of refraction ranging from 1.35 to 1.7, and have diameters ranging from 5 µm to 200 µm. In various embodiments, the focusing elements of plurality of focusing elements 105 comprise reflective focusing elements (for example, very small concave mirrors), with diameters ranging from 5 µm to 50 µm. While in this illustrative example, the focusing elements of plurality of focusing elements 105 are shown as comprising circular plano-convex lenses, other refractive lens geometries, for example, lenticular lenses, are possible and within the contemplated scope of this disclosure.

As shown in the illustrative example of FIG. 1, arrangement of image icons 120 comprises a set of image icons (including image icon 121), positioned at predetermined locations within the footprints of the focusing elements of plurality of focusing elements 105. According to various embodiments, the individual image icons of arrangement of image icons 120 comprise regions of light cured material associated with the focal path of structured light (for example, collimated UV light) light passing through plurality of focusing elements 105 from a projection point associated with one or more predetermined ranges of viewing angles. In some embodiments, the individual image icons of arrangement of image icons 120 are not provided within a structured image icon layer. As used in this disclosure, the term "structured image layer" encompasses a layer of material (for example, a light-curable resin) which has been embossed, or otherwise formed to comprise structures (for example, recesses, posts, grooves, or mesas) for positioning and retaining image icon material. According to various embodiments, the individual image icons of arrangement of image icons 120 are provided within a structured image layer, while at the same time, in absolute registration with a predetermined location in the footprint of a focusing element. In certain embodiments according to this disclosure, one or more image icon elements of arrangement of image icons 120 has a "gumdrop" shape, wherein a sidewall of the image icon tapers inwards towards a point of focus of a focusing element of plurality of focusing elements 105.

As shown in the illustrative example of FIG. 1, in certain embodiments, micro-optic system 100 includes an optical spacer 110. According to various embodiments, optical spacer 110 comprises a film of substantially transparent material which operates to position image icons of arrangement of image icons 120 in or around the focal plane of focusing elements of plurality of focusing elements 105. In certain embodiments according to this disclosure, optical spacer 110 comprises a manufacturing substrate upon which one or more layers of light curable material can be applied, and then selectively cured with structured light passed through plurality of focusing elements 105.

According to various embodiments, micro-optic system 100 comprises one or more regions of light-cured protective material 130 which occupy the spaces between the image icons of arrangement of image icons 120. In some embodiments, the arrangement of image icons 120 is first formed (for example, by selectively curing and removing liquid light-curable material on optical spacer 110), and then a layer of clear, light-curable material is applied to fill spaces between the image icons of arrangement of image icons 120 and then flood-cured to create a protective layer, which protects the image icons from being moved from their positions within the footprints of focusing elements of plurality of focusing elements 105. In certain embodiments, the light-curable material used to form arrangement of image icons 120 is a pigmented, ultraviolet (UV)-curable polymer. In some embodiments, as an alternative to a light-curable material, protective layer 130 may be formed from an adhesive material suitable for affixing micro-optic system 100 to substrate 150. According to various embodiments, by constructing protective layer 130 from an adhesive, the harvesting-resistance of micro-optic system 100 may be enhanced, in that, attempts to harvest micro-optic system 100 will cause some or all of the image icons of arrangement of image icons 120 to separate from micro-optic system 100 and remain adhered to substrate 150, thereby rendering micro-optic system 100 visibly compromised.

In certain embodiments according to this disclosure, micro-optic system 100 comprises a seal layer 140. According to certain embodiments, seal layer 140 comprises a thin (for example, a 2 µm to 50 µm thick layer) of substantially clear material which interfaces on a lower surface, with focusing elements of the plurality of focusing elements 105, and comprises an upper surface with less variation in curvature (for example, by being smooth, or by having a surface whose local undulations are of a larger radius of curvature than the focusing elements) than the plurality of focusing elements 105.

As shown in the non-limiting example of FIG. 1, in certain embodiments, micro-optic system 100 can be attached to a substrate 150, to form a security document 160. According to various embodiments, substrate 150 can be a sheet of currency paper, or a polymeric substrate. According to some embodiments, substrate 150 is a thin, flexible sheet of a polymeric film, biaxially oriented polypropylene (BOPP). In various embodiments, substrate 150 is a section of a synthetic paper material, such as TESLIN®. According to some embodiments, substrate 150 is a section of a polymeric card material, such as a polyethylene terephthalate (PET) blank of a type suitable for making credit cards and driver's licenses.

Figure 2:
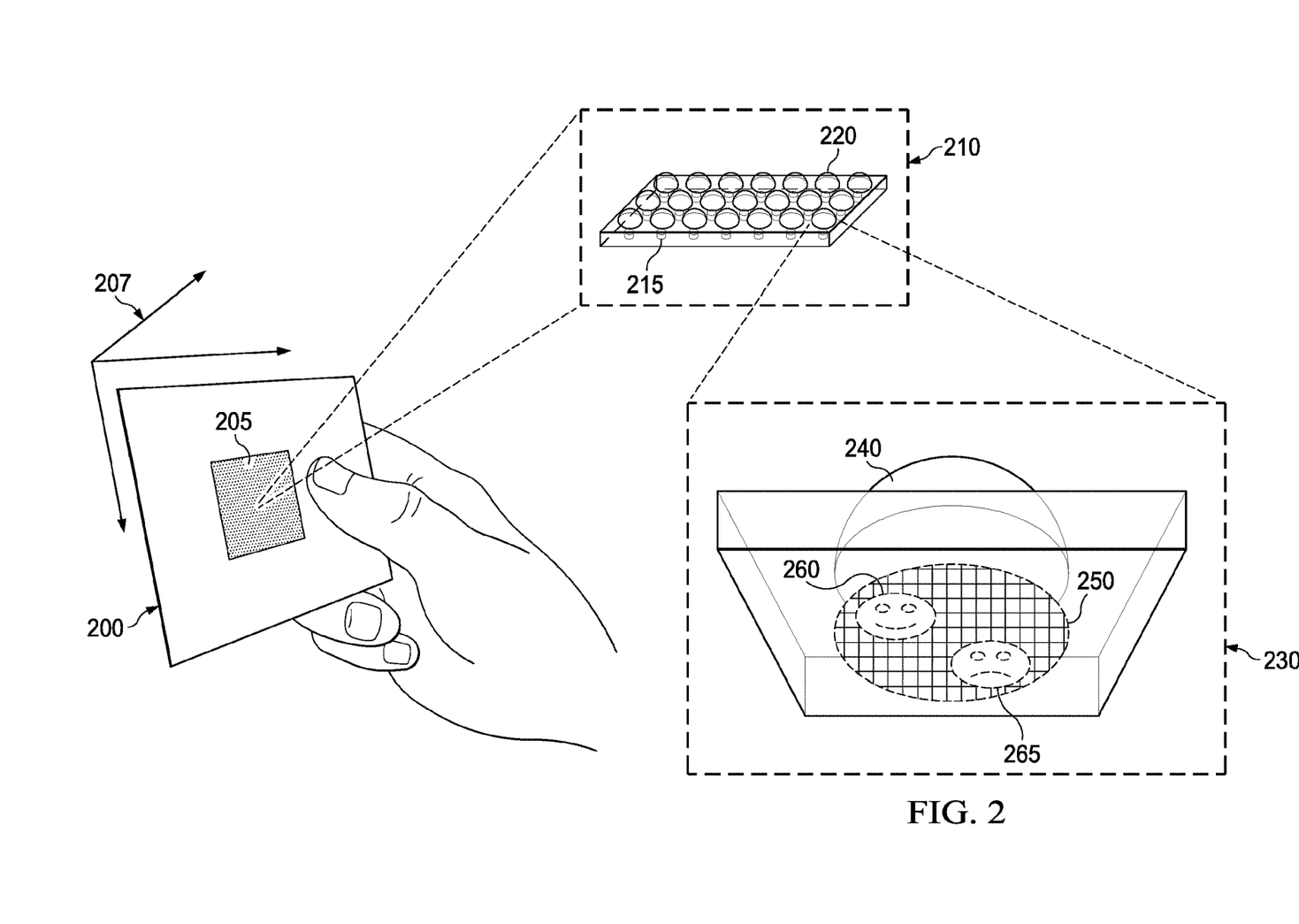
FIG. 2 illustrates an example of a micro-optic security device and a footprint of a focusing element of the micro-optic security device according to various embodiments of this disclosure.

FIG. 2 illustrates an example of a micro-optic security device and a footprint of a focusing element of the micro-optic security device according to various embodiments of this disclosure.

Referring to the non-limiting example of FIG. 2, a security document 200 is shown. According to various embodiments, security document 200 is a currency note. In some embodiments, security document 200 is an identification document, such as a page of a passport or a driver's license.

As shown in the illustrative example of FIG. 2, security document 200 comprises a micro-optic security device 205 (for example, micro-optic system 100 in FIG. 1). According to certain embodiments, micro-optic security device 205 is substantially coplanar with security document 200, and some or all of micro-optic security device 205 is maintained in a sufficiently flat condition to define a coordinate system 207 suitable for defining a viewing angle or viewing vector indicating a direction of incidence of a viewer's view of micro-optic security device 205, or a direction in which light is directed from micro-optic security device 205. In this explanatory example, micro-optic security device is depicted as a plane in a three-dimensional Cartesian coordinate system 207. Other coordinate systems, and refinements to account for curvature in micro-optic security device 205 are possible and within the contemplated scope of this disclosure.

As shown in the enlargement 210 of a portion of micro-optic security device 205, micro-optic security device 205 comprises an arrangement of image icons 215 (for example, arrangement of image icons 120 in FIG. 1), wherein each image icon of the arrangement of image icons comprises a region of light cured material with a focally tapered sidewall profile. According to various embodiments, and as shown in enlargement 210, micro-optic security device 205 further comprises a planar array of focusing elements 220. In some embodiments according to this disclosure, micro-optic security device 205 is relatively flexible, and can bend to accommodate intended bending (for example, bending of a currency note in a wallet or while moving around rollers in a vending machine or automatic teller machine). Accordingly, as used in this disclosure, the term "planar," as used in this disclosure, encompasses the property that, at a micro-level (for example, considering millimeter length sections of micro-optic security device 205), the constituent elements of micro-optic security device can be considered to be planar.

According to various embodiments, one or more of sealing layer 140, plurality of focusing elements 105, optical spacer 110 and protective layer 130 are formed from a light-curable material which is a polymeric matrix, and which can be applied in a liquid, or "goo" form to a flat surface and then cured using light to form harder, more dimensionally stable structures. Examples of materials for use in such polymeric matrices, and which have an index of refraction of 1.5 or less include, without limitation, isodecyl acrylate, dipropylene glycol diacrylate, tripropylene glycol diacrylate, polyester tetraacrylate, trimethylolpropane triacrylate, and hexanediol diacrylate. Further examples of light-curable materials according to embodiments of this include substantially transparent or clear, colored or colorless polymers such as acrylics, acrylated polyesters, acrylated urethanes, epoxies, polycarbonates, polypropylenes, polyesters and urethanes. Still further examples of materials which can be used in polymeric matrices according to some embodiments of this disclosure include, without limitation, acrylate monomers, acrylate oligomers, O-phenlyphenoxyethyl acrylate, phenylthioethyl acrylate, bis-phenylthioethyl acrylate, cumin phenoxyl ethyl acrylate, a biphenylmethyl acrylate, bisphenol A epoxy acrylates, fluorene-type acrylates, brominated acrylates, halogenated acrylates, melamine acrylates and combinations thereof. According to certain embodiments, the composition of the light curable material is specifically formulated to not include materials with a polarizing element, such as iodine, bromine, chlorine or sulfur.

In various embodiments according to this disclosure the index of refraction of material used to construct one or more of sealing layer 140, plurality of focusing elements 105, optical spacer 110 or protective layer 130 can be tuned, or adjusted, by adding, or adjusting the concentration of nanoparticles in the material mixture (for example, a polymeric matrix) used to form the component layer of micro-optic system 100. According to some embodiments, the index of refraction of certain component layers of micro-optic system 100 can be adjusted by adding, for example, inorganic nanoparticles with a particle diameter of 100 nm or less to the mixture. Examples of inorganic nanoparticles which can be added to a material mixture include, without limitation, aluminum oxide, zirconium dioxide, titanium dioxide, zinc sulfide or zinc telluride. According to certain embodiments, the addition of nanoparticles to the material mixture can raise the index of refraction of the material mixture from below 1.5, to above 1.7. In some embodiments, indices of refraction above 1.7 are possible through the addition of nanoparticles to an organic resin.

While in the non-limiting example of FIG. 2, the focusing elements of planar array of focusing elements 220 are shown as refractive focusing elements (in this example, plano-convex lenses), other embodiments using other types of focusing elements (for example, reflective focusing elements) are possible and within the contemplated scope of this disclosure.

As shown by further enlargement 230, each focusing element 240 of planar array of focusing elements 220 is associated with a footprint 250. According to various embodiments, footprint 250 comprises an area in which image icons can be placed, and upon which light can be focused by focusing element 240. Depending on embodiments, the area and shape of footprint 250 may be co-extensive with (for example, a circle having the same diameter and center) focusing element 240. Alternatively, in certain embodiments, the footprint of a focusing element may be larger than the focusing element, and can overlap with the footprint(s) of other focusing elements. In some embodiments, footprint 250 comprises a subset of the area beneath focusing element 240.

In certain embodiments, within footprint 250, one or more image icons 260 and 265 are positioned at positions within footprint 250 associated with a predetermined viewing angle of micro-optic security device 205. According to various embodiments, the one or more image icons 260 and 265 are formed from regions of light-cured material. In certain embodiments, the individual regions of light-cured material have a "gumdrop-like" shape, with sidewalls that taper inwards as the distance between the image icon and the focusing element increases. In some embodiments, the sidewall of the region of cured material may not exhibit the above-described focal taper, and will instead be substantially perpendicular to the plane of the surface upon which the region of light cured material is formed.

As suggested by the gridlines within footprint 250, each of image icons 260 and 265 occupy predefined positions within the area of footprint 250. By occupying predefined positions within footprint 250, each of image icons 260 and 265 can be said to exhibit absolute registration. As used in this disclosure, the term "absolute registration" encompasses a further degree of registration between focusing elements and image icons beyond aggregate registration. In a micro-optic system exhibiting aggregate registration, the aggregate dimensions of a layer of focusing elements and a layer of image icons register, with a humanly visible display appearing at an unknown viewing angle, and (in some embodiments), changing (for example, by turning on and off) at predetermined angles relative to the unknown viewing angle. However, in a system exhibiting aggregate registration, for a given footprint of a given focusing element, the location of the image icon within that footprint is not predetermined, or otherwise known in advance. By contrast, in a system exhibiting absolute registration, the positions of image icons within a particular footprint are predetermined, and associated with providing a particular human visible display at a predefined viewing angle in a coordinate system (for example, coordinate system 207). Thus, according to certain embodiments, micro-optic systems (for example micro-optic security device 205), with absolute registration exhibit an unexpectedly high degree of angular control over one or more human-visible displays provided by the micro-optic system.

While the illustrative example of FIG. 2 describes an embodiment in which the image icons 260 and 265 in footprint 250 contain all of the features of their respective human-visible displays, embodiments according to this disclosure are not so limited. According to certain embodiments, footprint 250 can include a control pattern, and regions of light-cured material corresponding to only part of a human-visible display can be provided within footprint 250.

Figure 3A:
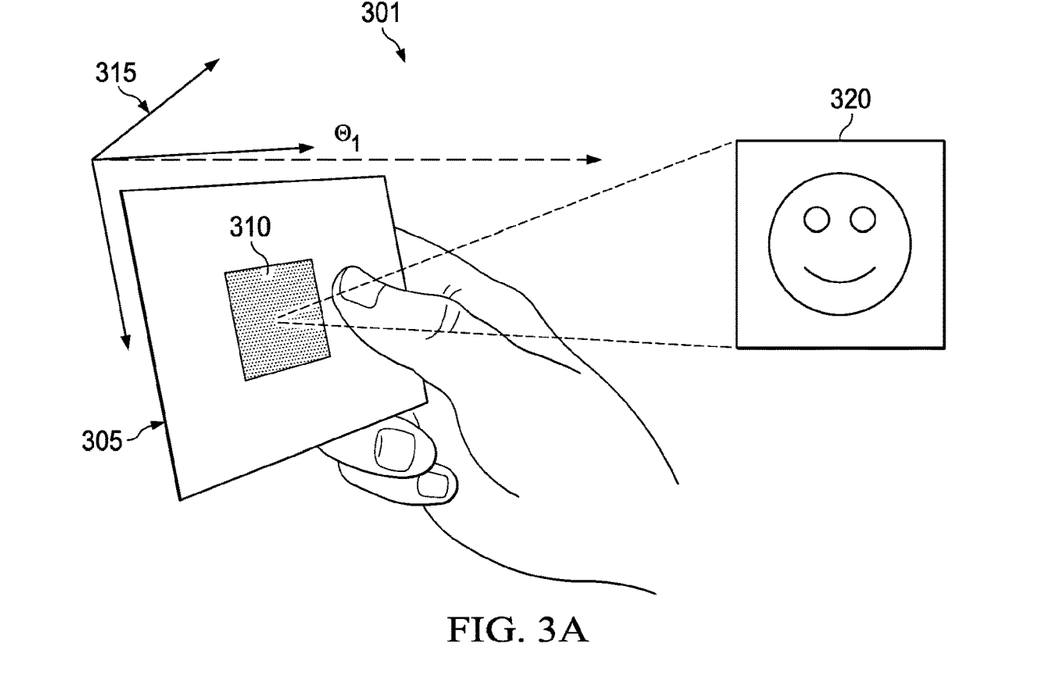
FIGS. 3A and 3B illustrate an example of a micro-optic security device and angular control over a visible display provided by micro-optic security devices according to some embodiments of this disclosure.
Figure 3B:
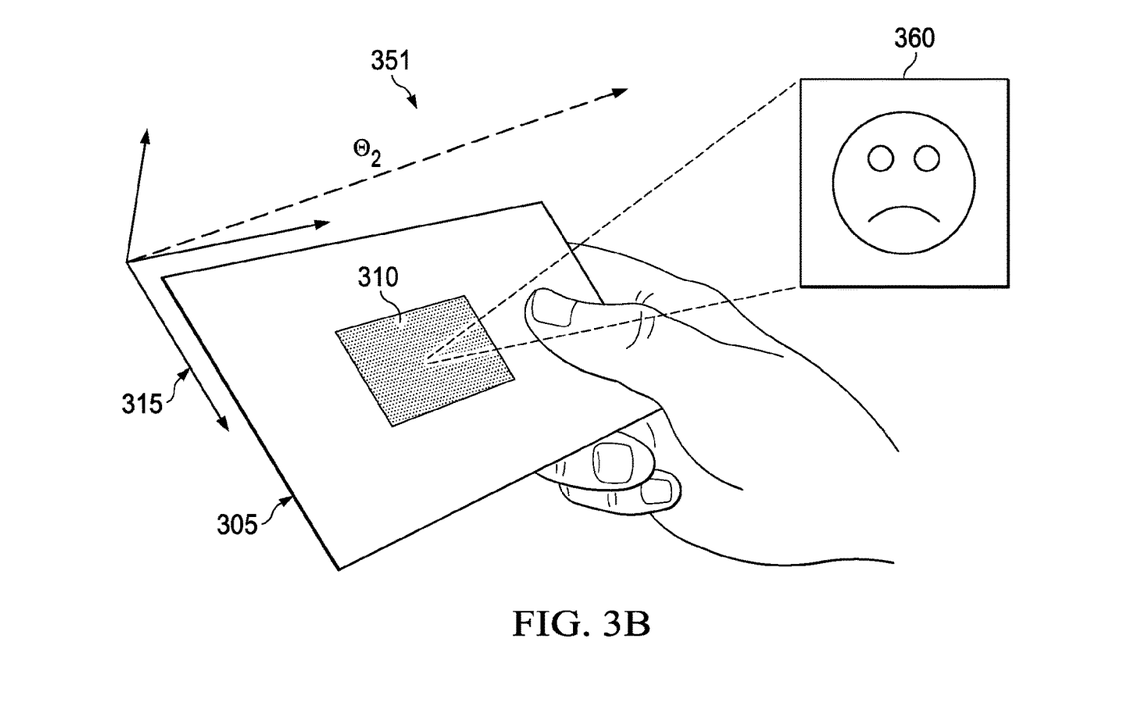

FIGS. 3A and 3B illustrate an example of a micro-optic security device and angular control over a visible display provided by micro-optic security devices according to some embodiments of this disclosure. For convenience of cross-reference, structures common to both FIGS. 3A and 3B are similarly numbered Referring to the non-limiting example of FIGS. 3A and 3B, a first view 301 (shown in FIG. 3A) and a second view 351 (shown in FIG. 3B) of a security document 305 (for example, security document 200 in FIG. 2) are shown. According to various embodiments, security document 200 comprises a micro-optic security device 310 (for example, micro-optic security device 205 in FIG. 2), which exhibits absolute registration. As shown in the illustrative example of FIGS. 3A and 3B, security document 305 is held by a viewer's right hand and maintained in a substantially planar condition such that the viewing angle can be expressed as one or more of a vector or a set of angular coordinates relative to a coordinate system 315. While in this non-limiting example, coordinate system 315 is a three-dimensional Cartesian coordinate system, other coordinate systems for expressing the viewing angle of security document 305 and micro-optic security device 310 are possible and within the contemplated scope of this disclosure. For example, in certain embodiments, to account for curvature, local regions of micro-optic security device 310 (in one example, 1 mm square sections) could be assigned a coordinate system which approximates local flatness. Accordingly, each point of the security device could be assigned a unique viewing vector in a 3-dimensional space.

As shown in the illustrative example of FIGS. 3A and 3B, in first view 301, security document 305 and micro-optic security device 310 are held such that the viewer is looking at micro-optic security device 310 at a first predetermined viewing angle, shown in the figure as $\Theta_1$. When viewed at $\Theta_1$, the focusing elements of micro-optic security device 310 provide a synthetically magnified image of the portions of the focusing elements' footprints (for example, image icon 260 in FIG. 2), comprising visual information associated with a first humanly visible display 320.

According to certain embodiments, in second view 351, security document 305 and micro-optic security device 310 are held such that the viewer is looking at micro-optic security device 310 at a second predetermined viewing angle, shown in the figure as $\Theta_2$. When viewed at $\Theta_2$, the focusing elements of micro-optic security device 310 provide a synthetically magnified image of the portions of the focusing elements' footprints (for example, image icon 265 in FIG. 2), comprising visual information associated with a second humanly visible display 360. In contrast to certain micro-optic systems which only exhibit aggregate registration, the absolute registration between the focusing elements and image icons of micro-optic security device 310 means that viewing angles $\Theta_1$ and $\Theta_2$ associated with first humanly visible display 320 and second humanly visible display 360 are predetermined in a coordinate system (for example, coordinate system 315). By contrast, in a system with only aggregate registration, while the difference between $\Theta_1$ and $\Theta_2$ (for example, a quantification of the change in viewing angle needed to produce a switch from first humanly visible display 320 and second humanly visible display 360) may be predetermined, uncertainty regarding the positions of image icons within the footprints of focusing elements means that the values of $\Theta_1$ and $\Theta_2$ are not predetermined. By contrast, certain micro-optic systems according to embodiments of this disclosure exhibit absolute registration between image icons and focusing elements, which, amongst other things, catalyzes a heightened degree of angular control over the presentation of humanly visible displays by the micro-optic system.

Figure 4A:
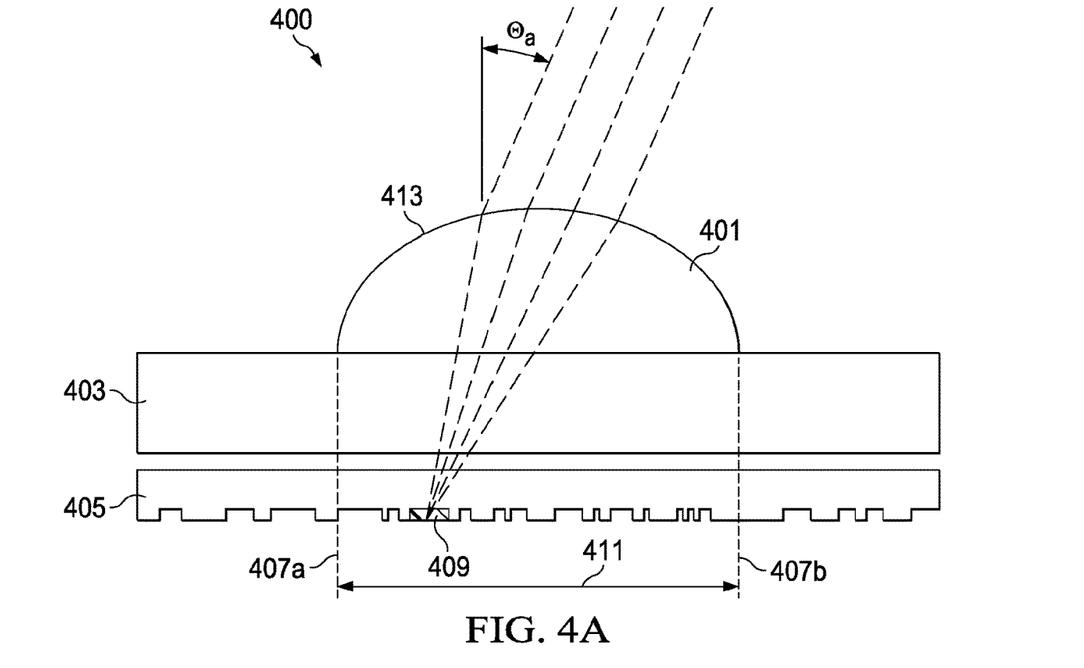
FIGS. 4A and 4B illustrate certain technical challenges associated with achieving angular control over visible displays in certain micro-optic security devices.
Figure 4B:
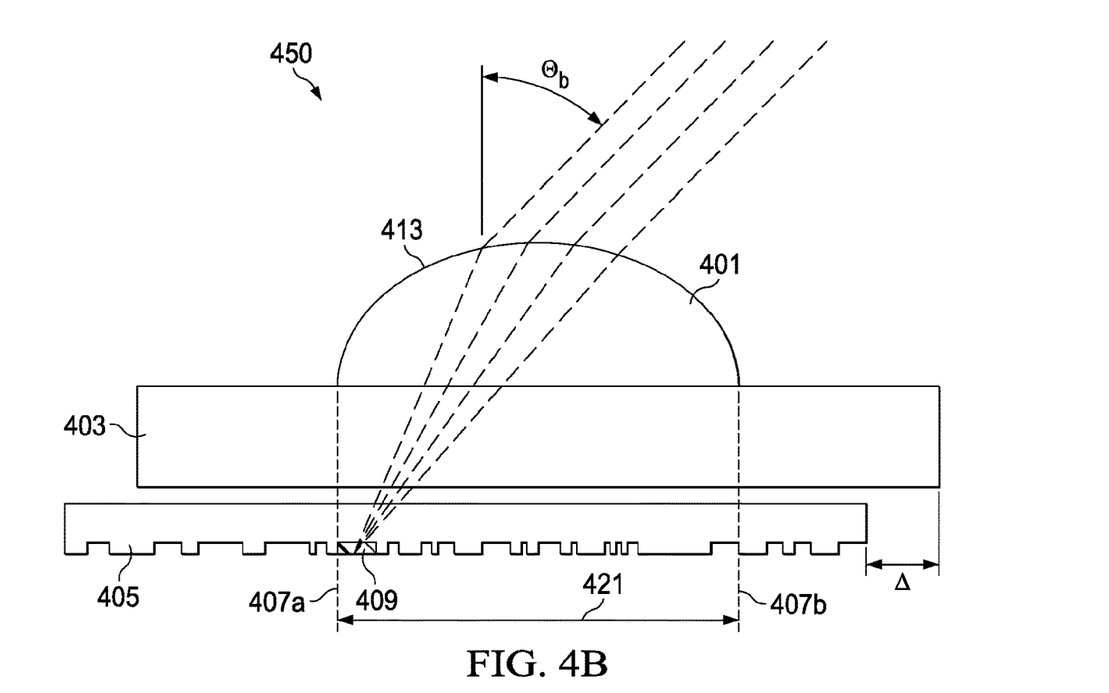

FIGS. 4A and 4B illustrate certain technical challenges associated with achieving angular control over visible displays in some micro-optic security devices. For convenience of cross-reference, structures common to both FIGS. 4A and 4B are numbered similarly.

Referring to the non-limiting example of FIGS. 4A and 4B, a first view 400 (shown in FIG. 4A) of a refractive focusing element 401, which is positioned on a first side of an optical spacer 403. A structured image icon layer 405 is positioned on a second side of optical spacer 403. Dashed lines 407a and 407b show the boundaries of the footprint of focusing element 401. While in this illustrative example, the footprint of focusing element 401 is co-extensive with the perimeter of focusing element 401, other embodiments, wherein the footprint is larger or smaller than focusing element 401 are possible and within the contemplated scope of this disclosure.

According to certain embodiments, structured image icon layer 405 comprises a layer of material with which defines a pattern of recesses, posts, mesas and other structures in the material. In various embodiments, the structures of structured image icon layer 405 position and retain subsequently applied (for example, by doctor blading resin into the voids in structured image icon layer 405) pigmented material, which fills the negative spaces in structured image icon layer. Referring to the non-limiting example of FIGS. 4A and 4B, a region 409 of pigmented material is shown as being retained within structures of structured image icon layer 405, and occupying a position at a first offset 411 to the right hand boundary 407b of the footprint of focusing element 401.

Referring to the non-limiting example of FIGS. 4A and 4B, in certain embodiments, light which passes through a lensing surface 413 of focusing element at a first viewing angle $\Theta_a$ is focused by focusing element 401 upon region 409 of pigmented material. As used in this disclosure, the term "lensing surface" encompasses both curved boundaries between regions of dissimilar indices of refraction (for example, in systems using refractive focusing elements) and curved regions of reflective material (for example, in systems using reflective focusing elements). According to certain embodiments, focusing element 401 is part of a larger, planar array of similar focusing elements, and structured image icon layer 405 is likewise part of a larger array of image icons. In some embodiments, the planar array of focusing elements (which includes focusing element 401) and the larger array of image icons (which includes structured image icon layer 405), synthetically magnify portions of the image icon layers to create a humanly visible display.

Second view 450 (shown in FIG. 4B) illustrates some of the technical challenges associated with achieving angular control over humanly visible displays provided by micro-optic systems in which registration of the pigmented image icons to the focusing elements relies exclusively on retaining pigmented material within structures of a structured image icon layer. As noted elsewhere in this disclosure, focusing elements according to certain embodiments of this disclosure have diameters of between 5 μm to 50 μm, with comparatively sized footprints. Given the scale of focusing elements' footprints, controlling the range of angles at which an image icon is visible through a particular focusing element requires positioning the image icon with micron or sub-micron accuracy. While it is possible to achieve micron and sub-micron control of the relative distances between structures within a structured icon layer (e.g., achieving aggregate registration), reliably positioning a structured image icon layer with micron or sub-micron accuracy relative to the footprints of an array of micro-optic focusing elements remains a significant technical challenge.

The technical challenges associated with registering a structured icon layer relative to specific locations within the footprint of a focusing element are shown with reference to second view 450. As shown in second view 450, due to for example, limited manufacturing tolerances or other confounding factors affecting the precision with which a structured icon layer relative to an array of focusing elements, structured image icon layer 405 is shifted by a small distance Δ, with the effect that region 409 is positioned at a new, second offset 421 relative to the right-hand boundary 407b of the footprint of focusing element 401. As a result of being positioned at a new coordinate within the footprint of focusing element 401, to be focused on region 409, light passing through the lensing surface 413 of focusing element 401 must be angled at a different angle $\Theta_b$ to be focused on region 409. In practical terms, the net effects of the uncertainty in the registration between the location of region 409 within the footprint of focusing element 401 include that the angle at which a humanly visible display in which region 409 contributes is not predetermined.

Figure 5A:
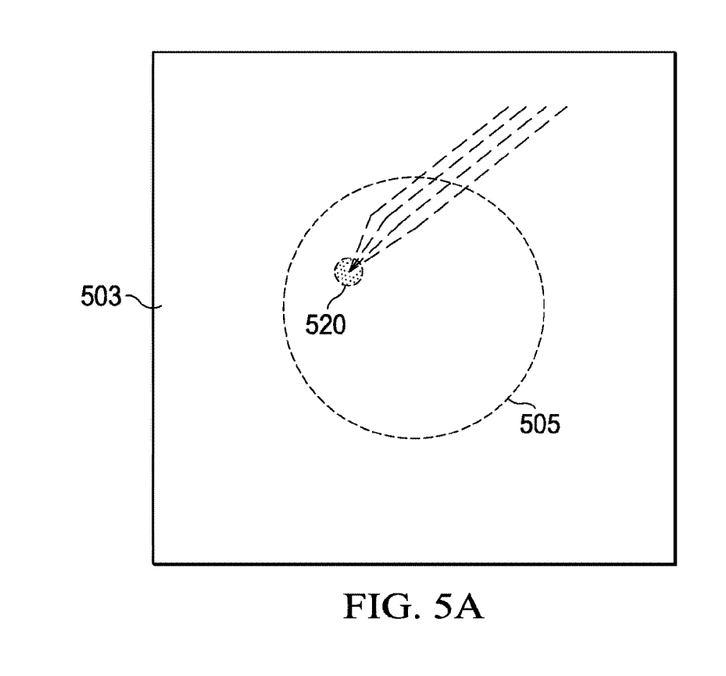
FIGS. 5A, 5B and 5C illustrate an example of passing structured light through a focusing element at a predetermined location within the focusing element's footprint according to various embodiments of this disclosure.
Figure 5B:
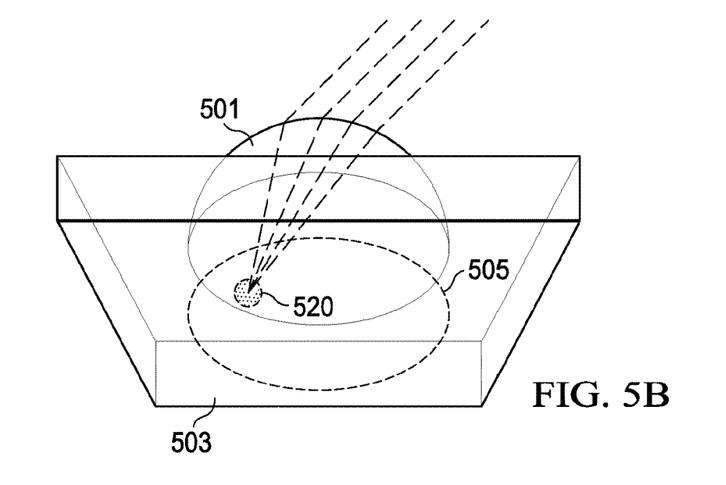
Figure 5C:
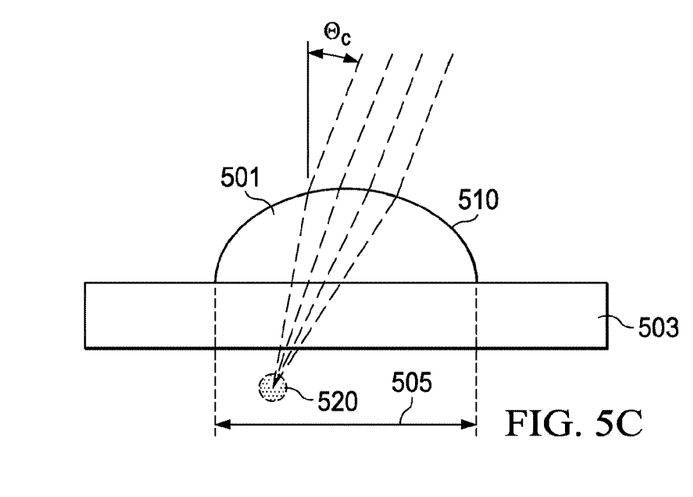

FIGS. 5A, 5B and 5C illustrate, from three different points of view, an example of passing structured light through a focusing element at a predetermined location within the focusing element's footprint according to various embodiments of this disclosure. For convenience of cross-reference, elements common to more than one figure of FIGS. 5A-5C are numbered similarly.

According to certain embodiments of this disclosure, the technical challenges associated with achieving absolute registration and attaining angular control over the presentation of humanly visible synthetically magnified displays can be overcome. In certain embodiments according to this disclosure, structured light is projected from projection angles corresponding to predetermined range of viewing angles at the lensing surfaces of focusing elements of a planar array of focusing elements, wherein the structured light is focused by the focusing elements of the planar array of focusing elements upon regions of uncured light-curable material within the footprints of the focusing elements of the planar array of focusing elements. Subsequently, the uncured light-curable material is removed (for example, with a spray wash) or chemically deactivated, such that only the cured regions of the light curable material are visible through the focusing elements at the predetermined range of viewing angles. In this way, the technical challenges associated with registering a structured icon layer to a specified location relative to the footprints of the focusing elements of the planar array of focusing elements are bypassed, and a micro-optic system exhibiting absolute registration can be produced.

Referring to the non-limiting example of FIGS. 5A-5C, a side view (FIG. 5C), an underside view (FIG. 5A) and an angled view (FIG. 5B) of a refractive focusing element 501, which is positioned on a portion of an optical spacer 503, is provided by the figure. According to certain embodiments, focusing element 501 is affixed to optical spacer 503 and has a fixed relationship to the surfaces of optical spacer 503. In certain embodiments, the fixed relationship between focusing element 501 and the surfaces of optical spacer 503 is achieved by applying a layer of light-curable material to optical spacer 503, embossing the layer of light-curable material to form a lensing surface and curing the material in situ. In some embodiments, the fixed relationship between focusing element 501 and the surfaces of optical spacer 503 is achieved by forming both focusing element 501 and optical spacer from a common layer of light-curable material, and curing the formed layer to create an integrated focusing element-optical spacer combination.

Focusing element 501 is associated with a footprint 505, which according to some embodiments, is coextensive with the perimeter of focusing element 501. According to some embodiments, footprint 505 is smaller than the perimeter of focusing element 501. In certain embodiments, footprint 505 describes an area which is larger than the perimeter of focusing element 501.

As shown in the illustrative examples of FIGS. 5A-5C, structured light (for example, collimated light, light from a projector, or light which has been passed through another array of focusing elements) is projected at the lensing surface of focusing element 501 at an angle (or a range of angles) associated with a predetermined viewing angle, which is shown in the figure as $\Theta_c$. The lensing action of focusing element 501 focuses the incident light in a region 520 within footprint 505. By using the structured light passing through focusing element 501 to create an image icon comprising a region of cured light curable material proximate to region 520, a micro-optic system with absolute registration according to various embodiments of this disclosure can be produced.

While FIGS. 5A-5C illustrate certain aspects of achieving angular control of a humanly visible synthetically magnified image in a micro-optic system using refractive focusing elements, embodiments according to this disclosure are not so limited, and other configurations of focusing elements, such as, for example, reflective focusing elements. Additionally, in some embodiments according to this disclosure, optical spacer 503 can be omitted, and a fixed relationship between a mounting surface for an image icon and a lensing surface of a focusing element can otherwise be achieved. For example, depending on the geometry and index of refraction of a plano-convex lens, the planar side of a plano-convex lens can define a surface having a fixed relationship to the lensing surface of the focusing element, upon which an image icon with absolute registration can be formed.

Figure 6A:
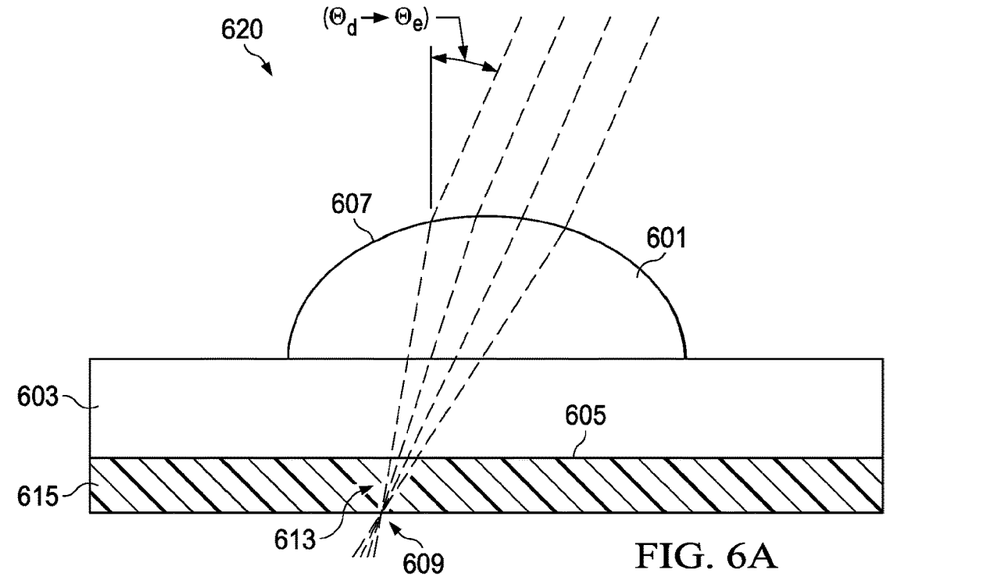
FIGS. 6A-6C illustrate operations of a method for creating image icons of an arrangement of image icons with absolute registration according to certain embodiments of this disclosure.
Figure 6B:
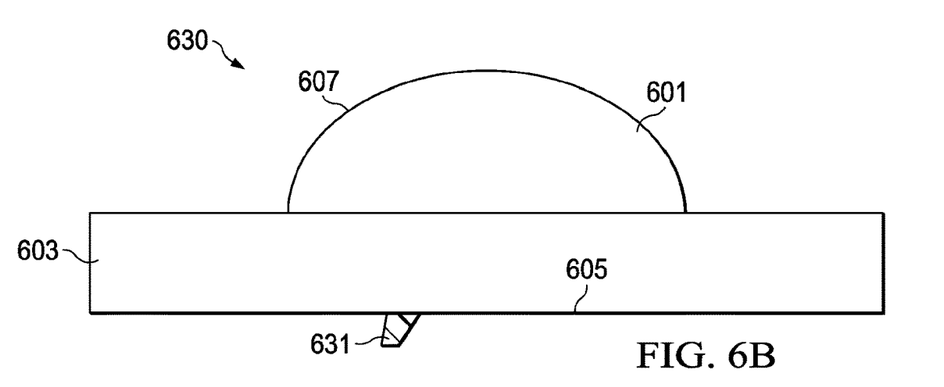
Figure 6C:
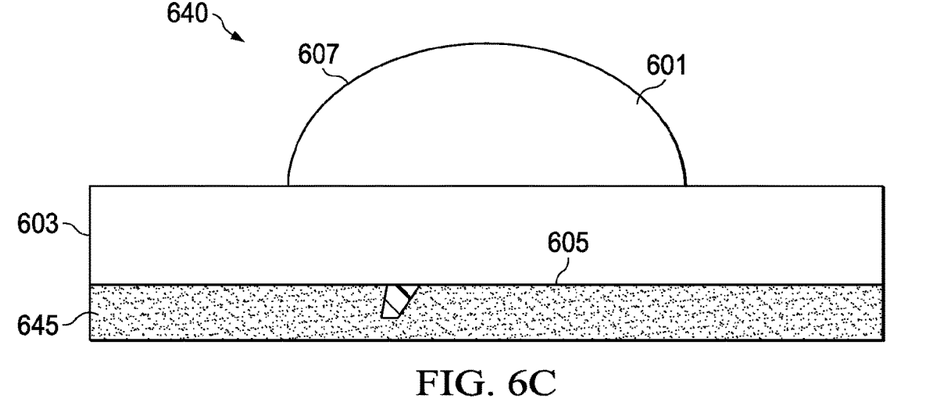

FIGS. 6A-6C illustrate operations of a method for creating image icons of an arrangement of image icons with absolute registration according to certain embodiments of this disclosure. For convenience of cross-reference, structures common to more than one of FIGS. 6A-6C are numbered similarly.

Referring to the non-limiting example of FIGS. 6A-6C, a focusing element 601 of a planar array of focusing elements in a micro-optic security device (for example, plurality of focusing elements 105 and micro-optic system 100 in FIG. 1) is shown as being positioned on an optical spacer 603, such that focusing element 601 has a fixed relationship with the bottom surface 605 of optical spacer 603. At a first operation 620 (shown in FIG. 6A) of a method for creating image icons with absolute registration an uncured layer of light-curable material 615 is applied to bottom surface 605 of optical spacer 603. In some embodiments, in performing operation 620, light-curable material 615 is applied in all the footprints of focusing elements of the array of focusing elements of which focusing element 601 is a member. In various embodiments, light-curable material 615 is applied to only a subset (e.g., a partial layer) of the footprints of focusing elements of the array of focusing elements of which focusing element 601 is a member. As part of operation 620, structured light associated with a pattern (for example, a pattern corresponding to the features of a humanly visible display provided by the micro-optic security system) is projected from a first predetermined range of viewing angles ($\Theta_d$ to $\Theta_e$) at a lensing surface 607 of focusing element 601. In some embodiments, focusing element 601 focuses the light at a focal point 609, and the interaction between the focused light and uncured layer of light-curable material 615 creates a region 613 of cured light-curable material forming all or part of an image icon of an arrangement of image icons. According to certain embodiments, region 613 of cured light-curable material has a focally tapered sidewall profile. As used in this disclosure, the term "focally tapered" encompasses reduction in the cross section of a region of cured light-curable material towards a focal point of a focusing element. When viewed under a microscope, focally tapered image icons may appear to have a "gumdrop" like shape.

As shown in the illustrative example of FIGS. 6A-6C, at operation 630 (shown in FIG. 6B), uncured light-curable material is removed from the bottom surface 605 of optical spacer 603, leaving an image icon 631. In some embodiments, the uncured light-curable material is deactivated to visibly contrast with image icon 631. As image icon 631 occupies a predetermined position within the footprint of focusing element 601, it is visible through focusing element 601 through the first predetermined range of viewing angles (i.e., $\Theta_d$ to $\Theta_e$). Further, because image icon 631 occupies a predetermined position within the footprint of focusing element 601, it is not visible through focusing element 601 through a second predetermined range of viewing angles. Put more simply, by creating image icon 631 by passing the curing light through the focusing element, angular control over the visibility (e.g., absolute registration) is achieved in certain embodiments according to this disclosure.

Referring again to the non-limiting example of FIGS. 6A-6C, at operation 640 (shown in FIG. 6C), a protective layer 645 of light-curable material is applied in the regions outside of image icon 631 and flood-cured. According to various embodiments, protective layer 645 helps maintain the registration of image icons relative to a predetermined location within the footprint of focusing element 601, by filling the spaces between image icons, thereby reducing the image icons' freedom of movement, and making it harder to dislodge the image icons from the surface to which they are attached. Further, in some embodiments, protective layer 645 also enhances the ruggedness of the micro-optic system by creating a retaining matrix which helps resist separation of image icon 631 from bottom surface 605 of optical spacer

603 during handling (for example, in a reel-to-reel process) and attachment to a substrate (for example, substrate 150 in FIG. 1).

Figure 7A:
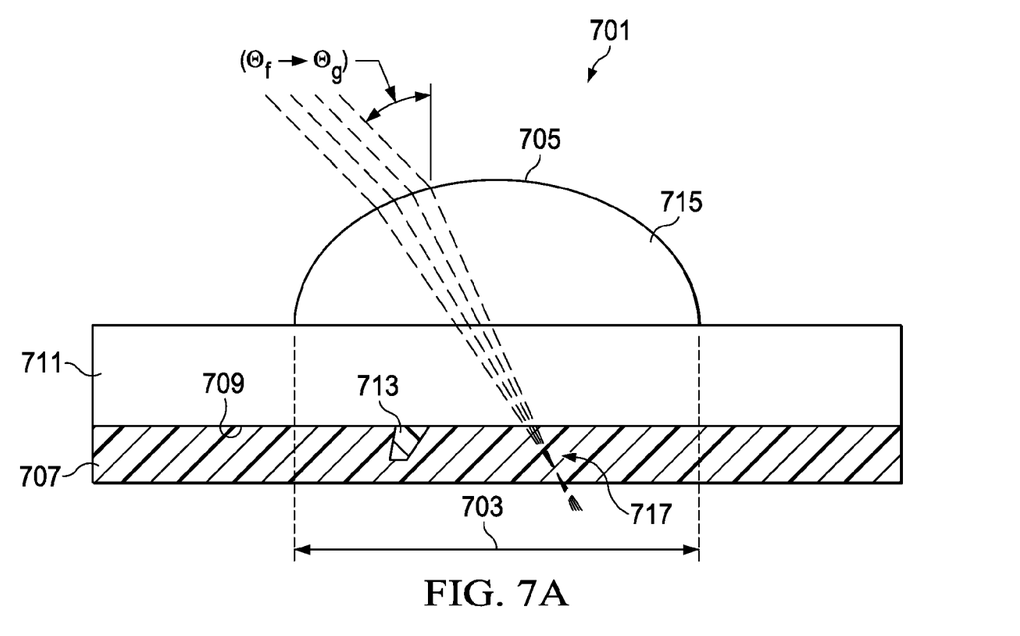
FIGS. 7A and 7B illustrate operations of a method for creating a second image icon within the footprint of a focusing element according to various embodiments of this disclosure.
Figure 7B:
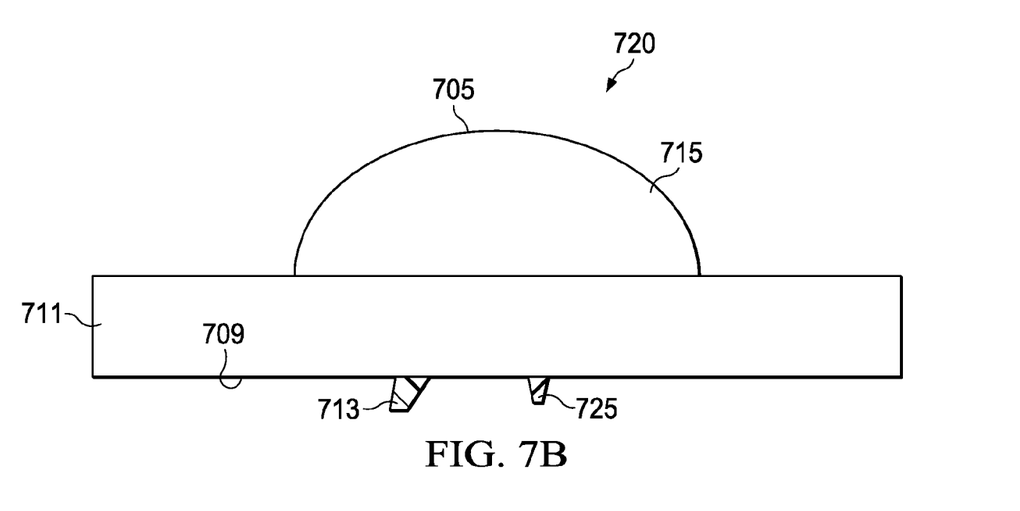

FIGS. 7A and 7B illustrate operations of a method for creating a second image icon within the footprint of a focusing element according to various embodiments of this disclosure. For convenience of cross-reference elements common to both of FIGS. 6A and 6B are similarly numbered. According to certain embodiments, a second image icon within the footprint of a focusing element can contribute the operation of a micro-optic security device in multiple ways.

As a first example, where a first image icon is of a first color, placing a second image icon of a second color at a position within the footprint of a focusing element near the first image icon can, when aggregated over a plurality of focusing elements and image icons, create regions in a synthetically magnified humanly visible display of a third color, where the third color is a mixture of the first two colors. As one example, a humanly visible display with red, blue and purple regions can be created using only red and blue image icons.

As a second example, placing a second image icon within the footprint of a focusing element, when aggregated over a plurality of focusing elements and second image icons, can be done to support a micro-optic security device in providing a second (or multiple) humanly visible displays which are visible and invisible at predetermined ranges of viewing angles. According to certain embodiments, absolute registration of image icons within the footprints of focusing elements permits creating pluralities of humanly visible displays, each of which is visible at a narrow, predetermined range of viewing angles, which can create the appearance of a humanly visible display which appears to be constantly moving (for example, by rotating) or changing shape.

Referring to the non-limiting example of FIGS. 7A and 7B, two operations of a method for creating a second image icon of a second color within the footprint 703 of a focusing element 705 are shown. According to certain embodiments, at operation 701 (shown in FIG. 7A), a fresh layer 707 of uncured light curable material of a second color relative to first image icon 713, is applied to a surface 709 (in this case, the underside of optical spacer 711) which has a fixed relationship to focusing element 705, and upon which a first image icon 713 has already been formed. According to certain embodiments, the light curable material of fresh layer 707 of uncured light curable material has the same characteristic color as first image icon 713. In some embodiments, the light curable material of fresh layer 707 of uncured light curable material has a different characteristic color than first image icon 713.

In some embodiments, as part of operation 701, structured light of a pattern of structured light (for example, a pattern corresponding to visible features of a second humanly visible display) is projected from a second predetermined range of viewing angles (shown in the figure as the range from $\Theta_f$ to $\Theta_g$) at lensing surface 715 of focusing element. As a result of passing structured light through focusing element 705 from the second predetermined range of viewing angles, a region 717 of cured light-curable material forming a second image icon is formed within footprint 703.

According to various embodiments, at operation 720 (shown in FIG. 7B), the uncured light-curable material in layer 707 of light-curable material is removed (for example, by spray washing) or otherwise deactivated, leaving second image icon as a region of contrast which is visible through focusing element 705 at viewing angles in the second predetermined range of viewing angles, and which is not visible through focusing element 705 at one or more predetermined ranges of viewing angles outside of the second predetermined range of viewing angles.

Examples of micro-optic security devices according to various embodiments of this disclosure include micro-optic security devices comprising a planar array of micro-optic focusing elements and a first arrangement of image icons, each image icon of the first arrangement of image icons comprising a region of light-cured material, wherein the first arrangement of image icons is visible through the planar array of micro-optic focusing elements across a first predetermined range of viewing angles relative to the micro-optic security device, and wherein the first arrangement of image icons is not visible through the planar array of micro-optic focusing elements across a second predetermined range of viewing angles relative to the micro-optic security device. While in the non-limiting example of FIGS. 7A and 7B, uncured light material of the first color (for example, material used to create image icon 713 is shown as being washed away after the formation of the first image icon, embodiments according to this disclosure are not so limited. In certain embodiments, multiple image icons associated with multiple viewing angles may be formed using light curable material of the first color without washing uncured material away between projecting light at different angles. In certain embodiments, uncured material of a first color is washed away to create space for uncured light curable material of a second color.

Examples of micro-optic security devices according to various embodiments of this disclosure include micro-optic security devices wherein the first arrangement of image icons is associated with a first characteristic color, and further comprising a second arrangement of image icons, each image icon of the second arrangement of image icons comprising a second region of light cured material, wherein the second arrangement of image icons is visible through the planar array of micro-optic focusing elements across a third predetermined range of viewing angles relative to the micro-optic security device, and wherein the second arrangement of image icons is not visible through the planar array of micro-optic focusing elements across a fourth predetermined range of viewing angles relative to the micro-optic security device.

Examples of micro-optic security devices according to various embodiments of this disclosure include micro-optic security devices wherein the second arrangement of image icons is associated with a second characteristic color.

Examples of micro-optic security devices according to various embodiments of this disclosure include micro-optic security devices wherein each image icon of the first arrangement of image icons is associated with a focusing element of the planar array of micro-optic focusing elements, wherein each image icon of the second arrangement of image icons is associated with a focusing element of the planar array of micro-optic focusing elements, wherein each focusing element of the planar array of micro-optic focusing elements has a footprint, and wherein the footprint of at least one focusing element of the planar array of micro-optic focusing elements comprises an image icon of the first arrangement of image icons and an image icon of the second arrangement of image icons.

Examples of micro-optic security devices according to various embodiments of this disclosure include micro-optic security devices wherein the first arrangement of image icons is disposed relative to the planar array of micro-optic focusing elements such that a portion of the planar array of micro-optic focusing elements forms a synthetic image of a portion of the first arrangement of image icons.

Examples of micro-optic security devices according to various embodiments of this disclosure include micro-optic security devices wherein each image icon of the first arrangement of image icons is associated with a focusing element of the planar array of micro-optic focusing elements, wherein each focusing element of the planar array of micro-optic focusing elements has a footprint, and wherein a plurality of image icons of the first arrangement of image icons are disposed at different locations within the footprints of their respective focusing elements to project at least one of a synthetic image, a three-dimensional image, an image with a movement effect, or an image with an animation effect.

Examples of micro-optic security devices according to various embodiments of this disclosure include micro-optic security devices wherein image icons of the first arrangement of image icons are disposed relative to the planar array of micro-optic focusing elements to create a flicker effect with a predetermined "on" period.

Examples of micro-optic security devices according to various embodiments of this disclosure include micro-optic security devices comprising one or more regions of light-cured protective material between image icons of the first arrangement of image icons.

Examples of micro-optic security devices according to various embodiments of this disclosure include micro-optic security devices wherein image icons of the first arrangement of image icons are not provided within a structured image icon layer.

Examples of micro-optic security devices according to various embodiments of this disclosure include micro-optic security devices wherein image icons of the first arrangement of image icons are provided within a structured image icon layer.

Examples of micro-optic security devices according to various embodiments of this disclosure include micro-optic security devices wherein focusing elements of the planar array of micro-optic focusing elements comprise refractive focusing elements.

Examples of micro-optic security devices according to various embodiments of this disclosure include micro-optic security devices wherein focusing elements of the planar array of micro-optic focusing elements comprise reflective focusing elements.

Examples of micro-optic security devices according to various embodiments of this disclosure include micro-optic security devices wherein image icons of the first arrangement of image icons comprise regions of light-cured material with focally tapered sidewall profiles.

Examples of micro-optic security devices according to various embodiments of this disclosure include micro-optic systems wherein the protective layer comprises a layer of adhesive material.

Examples of methods of manufacturing micro-optic systems according to various embodiments of this disclosure include methods comprising applying a layer of light-curable material to a first surface of the micro-optic system having a fixed relationship to a planar array of focusing elements, wherein the first surface is disposed proximate to one or more focal points of focusing elements of the planar array of focusing elements, directing a first pattern of structured light at a lensing surface of the planar array of focusing elements until a first portion of the layer of light-curable material is cured to form a first arrangement of image icons, and removing or deactivating uncured light-curable material from the first surface of the micro-optic system, wherein the first pattern of structured light is directed at the lensing surface of the planar array of focusing elements from a first predetermined range of viewing angles relative to the planar array of focusing elements.

Examples of methods of manufacturing micro-optic systems according to various embodiments of this disclosure include methods comprising directing a second pattern of structured light at the lensing surface of the planar array of focusing elements until a second portion of the layer of light-curable material is cured to form a second arrangement of image icons, wherein the second pattern of structured light is directed at the lensing surface of the planar array of focusing elements from a second predetermined range of viewing angles relative to the planar array of focusing elements.

Examples of methods of manufacturing micro-optic systems according to various embodiments of this disclosure include methods wherein image icons of the first arrangement of image icons are associated with a first characteristic color, and wherein image icons of the second arrangement of image icons are associated with a second characteristic color.

Examples of methods of manufacturing micro-optic systems according to various embodiments of this disclosure include methods wherein each image icon of the first arrangement of image icons is associated with a focusing element of the planar array of focusing elements, wherein each image icon of the second arrangement of image icons is associated with a focusing element of the planar array of focusing elements, wherein each focusing element of the planar array of focusing elements has a footprint, and wherein the footprint of at least one focusing element of the planar array of focusing elements comprises an image icon of the first arrangement of image icons and an image icon of the second arrangement of image icons.

Examples of methods of manufacturing micro-optic systems according to various embodiments of this disclosure include methods wherein the first arrangement of image icons is disposed relative to the planar array of focusing elements such that a portion of the planar array of focusing elements forms a synthetic image of a portion of the first arrangement of image icons.

Examples of methods of manufacturing micro-optic systems according to various embodiments of this disclosure include methods wherein image icons of the first arrangement of image icons are formed at predefined positions on the first surface of the micro-optic system relative to the planar array of focusing elements to create a flicker effect with a predetermined "on" period.

Examples of methods of manufacturing micro-optic systems according to various embodiments of this disclosure include methods comprising applying a layer of light-curable protective material to portions of the first surface in between image icons of the first arrangement of image icons and flood-curing the layer of light-curable protective material.

Examples of methods of manufacturing micro-optic systems according to various embodiments of this disclosure include methods comprising applying a protective layer of adhesive material to portions of the first surface in between image icons of the first arrangement of image icons.

Examples of methods of manufacturing micro-optic systems according to various embodiments of this disclosure include methods wherein image icons of the first arrangement of image icons are formed in a structured image icon layer.

Examples of methods of manufacturing micro-optic systems according to various embodiments of this disclosure include methods wherein image icons of the first arrangement of image icons are not formed in a structured image icon layer.

Examples of methods of manufacturing micro-optic systems according to various embodiments of this disclosure include methods wherein focusing elements of the planar array of focusing elements comprise refractive focusing elements.

Examples of methods of manufacturing micro-optic systems according to various embodiments of this disclosure include methods wherein focusing elements of the planar array of focusing elements comprise reflective focusing elements.

Examples of methods of manufacturing micro-optic systems according to various embodiments of this disclosure include methods wherein each image icon of the first arrangement of image icons is associated with a focusing element of the planar array of focusing elements, wherein each focusing element of the planar array of focusing elements has a footprint, and wherein a plurality of image icons of the first arrangement of image icons are disposed at different locations within the footprints of their respective focusing elements to create a synthetic image with a three-dimensional effect.

Examples of methods of manufacturing micro-optic systems according to various embodiments of this disclosure include methods wherein an image icon of the first arrangement of image icons is formed with a focally tapered sidewall profile.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A micro-optic security device, comprising:
   a planar array of micro-optic focusing elements; and
   a first arrangement of image icons, each image icon of the first arrangement of image icons comprising a region of light-cured material,
   wherein the first arrangement of image icons occupies one or more locations within footprints of focusing elements of the planar array of focusing elements such that the first arrangement of image icons is visible through the planar array of micro-optic focusing elements across a first predetermined range of viewing angles relative to the micro-optic security device, and
   wherein the first arrangement of image icons is outside of the one or more locations within footprints of focusing elements which are visible across a second predetermined range of viewing angles, and the first arrangement of image icons is not visible through the planar array of micro-optic focusing elements across the second predetermined range of viewing angles relative to the micro-optic security device.

2. The micro-optic security device of claim 1, wherein the first arrangement of image icons has a first characteristic color, and further comprising:
   a second arrangement of image icons, each image icon of the second arrangement of image icons comprising a second region of light cured material, wherein each icon of the second arrangement of image icons occupies locations within the footprints of focusing elements corresponding to a third predetermined range of viewing angles,
   wherein the second arrangement of image icons is visible through the planar array of micro-optic focusing elements across the third predetermined range of viewing angles relative to the micro-optic security device, and
   wherein the second arrangement of image icons is not visible through the planar array of micro-optic focusing elements across a fourth predetermined range of viewing angles relative to the micro-optic security device.

3. The micro-optic security device of claim 2, wherein the second arrangement of image icons has a second characteristic color.

4. The micro-optic security device of claim 2,
   wherein each focusing element of the planar array of micro-optic focusing elements has a footprint
   wherein each image icon of the first arrangement of image icons is located in a footprint of a focusing element of the planar array of micro-optic focusing elements,
   wherein each image icon of the second arrangement of image icons is located in a focusing element of the planar array of micro-optic focusing elements,
   and
   wherein a footprint of at least one focusing element of the planar array of micro-optic focusing elements comprises an image icon of the first arrangement of image icons and an image icon of the second arrangement of image icons.

5. The micro-optic security device of claim 1, wherein the first arrangement of image icons is disposed relative to the planar array of micro-optic focusing elements such that a portion of the planar array of micro-optic focusing elements forms a synthetic image of a portion of the first arrangement of image icons.

6. The micro-optic security device of claim 1,
   wherein each focusing element of the planar array of micro-optic focusing elements has a footprint,
   wherein each image icon of the first arrangement of image icons is located in a focusing element of the planar array of micro-optic focusing elements,
   and
   wherein a plurality of image icons of the first arrangement of image icons are disposed at different locations within the footprints of their respective focusing elements to project at least one of a synthetic image, a three-dimensional image, an image with a movement effect, or an image with an animation effect.

7. The micro-optic security device of claim 1, wherein image icons of the first arrangement of image icons are disposed relative to the planar array of micro-optic focusing elements to create a flicker effect with a predetermined "on" period, or
   wherein image icons of the first arrangement of image icons are not provided within a structured image layer, or
   wherein image icons of the first arrangement of image icons are provided within a structured image layer.

8. The micro-optic security device of claim 1, further comprising a protective layer, wherein the protective layer comprises at least one of an adhesive layer applied to portions of a first surface, or regions of light cured protective material between image icons of the first arrangement of image icons.

9. The micro-optic security device of claim 1, wherein focusing elements of the planar array of micro-optic focusing elements comprise refractive focusing elements, or wherein focusing elements of the planar array of micro-optic focusing elements comprise reflective focusing elements.

10. The micro-optic security device of claim 1, wherein image icons of the first arrangement of image icons comprise regions of light-cured material with focally tapered sidewall profiles, wherein the image icons narrow towards a focal point of a focusing element.

11. A method of manufacturing a micro-optic system, the method comprising:
applying a layer of light-curable material to a first surface of the micro-optic system wherein the first surface is disposed proximate to one or more focal points of focusing elements of a planar array of focusing elements;
directing a first pattern of structured light at a lensing surface of the planar array of focusing elements until a first portion of the layer of light-curable material is cured to form a first arrangement of image icons; and
removing or deactivating uncured light-curable material from the first surface of the micro-optic system,
wherein the first pattern of structured light is directed at the lensing surface of the planar array of focusing elements from a first predetermined range of viewing angles relative to the planar array of focusing elements.

12. The method of claim 11, further comprising:
directing a second pattern of structured light at the lensing surface of the planar array of focusing elements until a second portion of the layer of light-curable material is cured to form a second arrangement of image icons,
wherein the second pattern of structured light is directed at the lensing surface of the planar array of focusing elements from a second predetermined range of viewing angles relative to the planar array of focusing elements.

13. The method of claim 12,
wherein image icons of the first arrangement of image icons has a first characteristic color, and
wherein image icons of the second arrangement of image icons has a second characteristic color.

14. The method of claim 12,
wherein each image icon of the first arrangement of image icons is associated with a focusing element of the planar array of focusing elements,
wherein each image icon of the second arrangement of image icons is associated with a focusing element of the planar array of focusing elements,
wherein each focusing element of the planar array of focusing elements has a footprint, and
wherein a footprint of at least one focusing element of the planar array of focusing elements comprises an image icon of the first arrangement of image icons and an image icon of the second arrangement of image icons.

15. The method of claim 11, wherein the first arrangement of image icons is disposed relative to the planar array of focusing elements such that a portion of the planar array of focusing elements forms a synthetic image of a portion of the first arrangement of image icons.

16. The method of claim 11, wherein image icons of the first arrangement of image icons are formed at predefined positions on the first surface of the micro-optic system relative to the planar array of focusing elements to create a flicker effect with a predetermined "on" period, or
wherein image icons of the first arrangement of image icons are formed in a structured image icon layer, or
wherein image icons of the first arrangement of image icons are not formed in a structured image icon layer.

17. The method of claim 11, further comprising:
applying a protective layer to portions of the first surface, wherein the protective layer comprises at least one of an adhesive layer applied to portions of the first surface, or regions of flood cured light-curable protective material between image icons of the first arrangement of image icons.

18. The method of claim 11, wherein focusing elements of the planar array of focusing elements comprise refractive focusing elements, or
wherein focusing elements of the planar array of focusing elements comprise reflective focusing elements.

19. The method of claim 11,
wherein each focusing element of the planar array of focusing elements has a footprint,
wherein each image icon of the first arrangement of image icons is located in a footprint a focusing element of the planar array of focusing elements, and
wherein a plurality of image icons of the first arrangement of image icons are disposed at different locations within the footprints of their respective focusing elements to project at least one of a synthetic image, a three-dimensional image, an image with a movement effect, or an image with an animation effect.

20. The method of claim 11, wherein an image icon of the first arrangement of image icons has a focally tapered sidewall profile, extending away from the first surface.

* * * * *